United States Patent [19]

Ganske

[11] Patent Number: 4,967,790
[45] Date of Patent: Nov. 6, 1990

[54] SWING CHECK VALVE

[76] Inventor: Roger H. Ganske, 4908 - 46 Street, Drayton Valley, Alberta, 0M0

[21] Appl. No.: 371,629

[22] Filed: Jun. 26, 1989

[51] Int. Cl.$^5$ ............................................. F16K 15/03
[52] U.S. Cl. ................................ 137/514.5; 137/527.8
[58] Field of Search ........................... 137/514.5, 527.8

[56] References Cited

U.S. PATENT DOCUMENTS

| | | | |
|---|---|---|---|
| 364,206 | 6/1887 | Baltzley | 137/527.8 |
| 378,600 | 2/1888 | Lenhart | 137/527.8 |
| 1,000,719 | 8/1911 | Cram | 137/527.8 X |
| 1,577,637 | 3/1926 | Hess | 137/527.8 X |
| 1,926,759 | 9/1933 | Wallman | 137/527.8 X |

*Primary Examiner*—Robert G. Nilson
*Attorney, Agent, or Firm*—Ernest Peter Johnson

[57] ABSTRACT

A gravity closed swing check valve is provided in which the downstream surface of the solid clapper is semi-spherical and convex. The body of the valve forms a concave semi-spherical cavity. The radii of the clapper and cavity surfaces is the same. The clapper is positioned so that its downstream surface bears evenly across the surface of the body cavity, when the clapper is in the fully open position. Thus the cavity surface of the body acts as a stop for the clapper and the area of stop surface is relatively large. Impact damage is reduced as a result.

1 Claim, 2 Drawing Sheets

SWING CHECK VALVE

FIELD OF THE INVENTION

The invention relates to an improved gravity closed, swing check valve of the type used for pressurized service.

BACKGROUND OF THE INVENTION

The invention is an improved version of a conventional gravity closed, swing check valve. This type of valve has a solid clapper which pivots on a hinge pin between open and closed positions. When opening, rotation of the clapper is limited by contact with a stop, which may be the body of the valve or a protruding stop carried by the body, or a stop attached to the hinge itself.

The present invention was developed in connection with gravity closed, swing check valves which were being used in pressurized service in oilfield applications. It was noted in connection with these valves that they would commonly fail as a result of breakage of the hinge pin or deformation of the clapper.

Applicant surmised that this damage had two root causes. Firstly, surges of pressurized fluid flow would cause the clapper to open very quickly and with considerable force. And secondly, the contact area between the clapper and the stop was small, in some valve designs being only line contact. Thus the impact loading was concentrated.

Applicant concluded that a change in this respect might effectively reduce the damage. Applicant therefore set out to design a gravity closed, swing check valve that would have a relatively large contact area between the clapper and body in the fully open position, thereby better distributing the impact load and reducing local effects on the hinge pin and clapper.

SUMMARY OF THE INVENTION

In accordance with the invention, a gravity closed, swing check valve is provided having a relatively large contact area between the solid clapper and the valve body in the fully open position. More particularly, the clapper is formed with a convex semi-spherical rear (or downstream) surface and the body is formed with a matching concave, semi-spherical cavity of the same radius as the clapper. The concave surface of the body cavity functions as the stop for the clapper. When said clapper is in the fully open position, the clapper seats in the cavity and bears evenly across the cavity surface, thereby providing a greatly increased contact surface between clapper and body.

As a result of this change, loading of the pivot pin is relatively reduced during impact and the impact is also better distributed over the clapper. In addition, it is believed that fluid trapped between the closing and matching contact surfaces has a cushioning effect, which is enhanced by the relative increase in contact surface area.

By a gravity closed, swing check valve is meant that type of valve whose clapper is swung up to the open position by the pressurized flow through the valve, said clapper being operative to swing down to the closed position due to the action of gravity when the upstream flow pressure becomes negligible.

Broadly stated, the invention is a gravity closed, swing check valve for pressurized service, said valve having a body forming a passage for pressurized fluid flow and a solid clapper pivotally suspended from the body, said clapper being movable by gravity to a closed position, in which it blocks the passage, and a fully open position in which the clapper is suspended by the pressurized fluid flow against the force of gravity and in which it contacts the body, the clapper having a planar upstream surface and convex semi-spherical downstream surface, the body forming a cavity having a concave semi-spherical surface having the same radius as the clapper, whereby it conforms with the clapper's convex surface and provides a stop therefor, said clapper being positioned so that, on being raised into the fully open position, it seats in the cavity, contacts the stop surface and bears evenly across said surface.

DESCRIPTION OF THE PREFERRED EMBODIMENT

Figure 1:
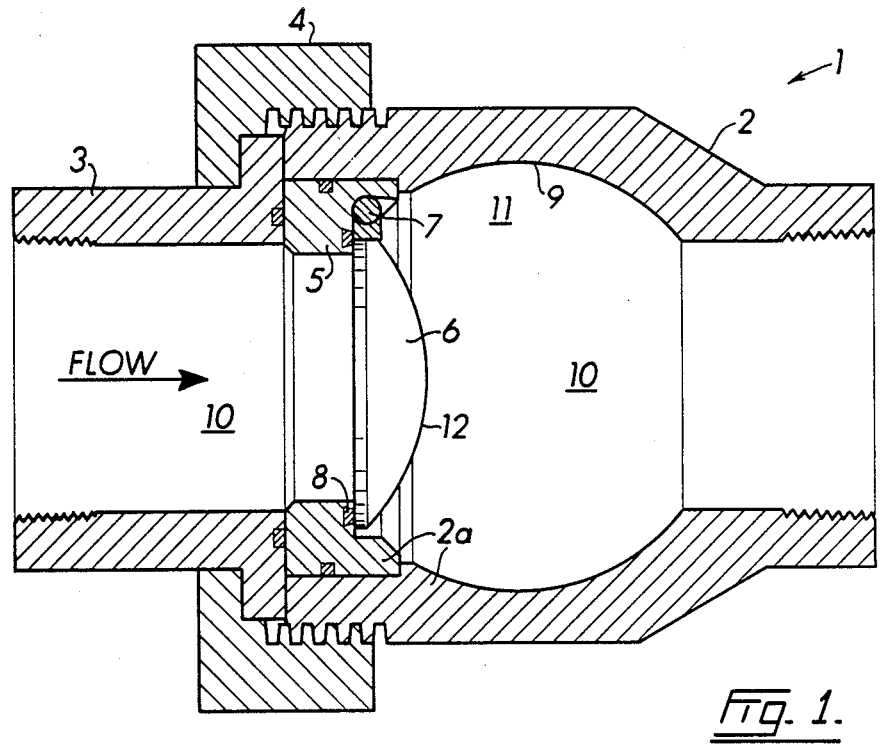
FIG. 1 is a sectional side view of a fully opening gravity closed, swing check valve with the clapper shown in the closed position.
Figure 2:
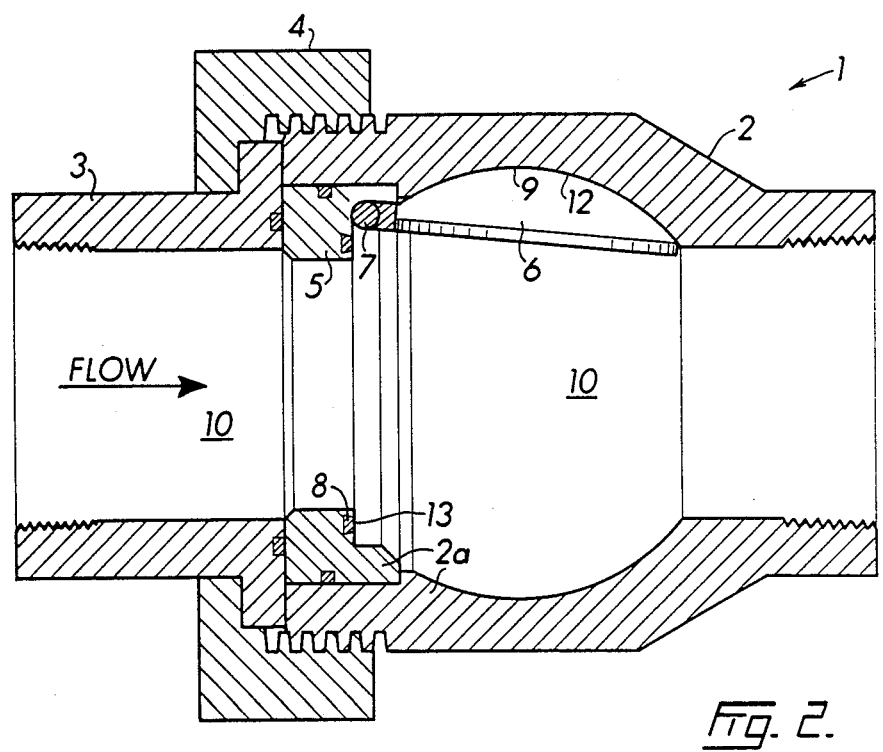
FIG. 2 is a sectional side view of the valve of FIG. 1 with the clapper in the fully open position.

Having reference to FIGS. 1 and 2, the check valve 1 is of the gravity closed type used for pressurized service, such as oilfield service. It comprises an upstream threaded coupling 3, a valve body member 2, a seat-forming insert 5 clamped between the coupling 3 and body member 2, a threaded coupling 4 which secures the coupling 3 to the body member 2, and a solid clapper 6 pivotally suspended from the insert 5 by a hinge pin 7. The parts are suitably sealed by seals 8. The parts form a passage 10 for the flow of pressurized fluid. The body member 2 and insert 5 together form a valve body 2a.

The clapper 6 can pivot from a closed position, shown in FIG. 1, in which it seals against seat 13 to block passage 10, to a fully open position, shown in FIG. 2, in which it contacts the inner surface of the body 2.

In the particular embodiment shown, the clapper 6 is vertically disposed when in the closed position and generally horizontally disposed when in the open position. It is the pressurized fluid flow that raises the clapper from the closed position to the open position. Gravity causes the clapper to swing down to the closed position when the upstream pressure is removed. Hence the clapper normally wants to assume the closed position.

The clapper 6 has a planar upstream surface and a convex semi-spherical downstream surface 12. The inner surface of the body member 2 is formed to provide a cavity 11 whose concave semi-spherical surface 9 matches or has the same radius as that of the clapper surface 12. The word 'semi-spherical' is not intended to be limited to a full half sphere—it is intended to describe surfaces that are spherical in configuration but only extend for part of the extent of a sphere.

The clapper 6, hinge pin 7 and body member 2 are configured and located so that the clapper seats in the cavity 11 and the clapper surface 12 conforms with and evenly contacts the body cavity surface 9.

Figure 3:
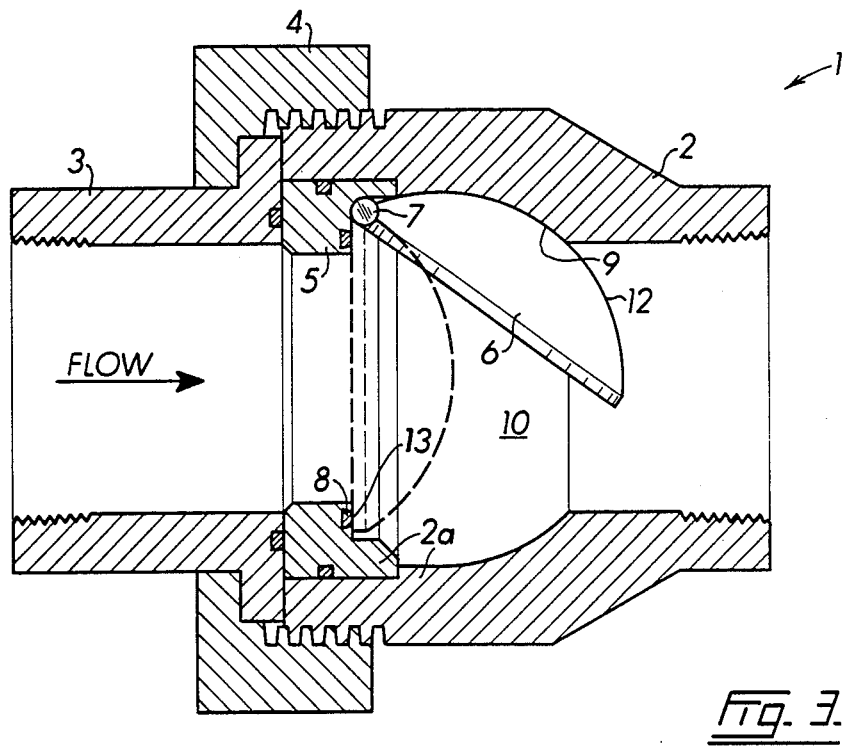
FIG. 3 is a sectional side view showing a regular opening gravity closed, swing check valve with the clapper shown in broken lines in the closed position and in full lines in the fully open position.

The embodiment of the check valve 1 shown in FIG. 3 is a partial or regular opening version. Only part of the length of the clapper 6 contacts the body cavity surface 9.

The embodiments of the invention in which an exclusive property or privilege is claimed are defined as follows:

1. A gravity closed swing check valve for pressurized service, said valve having a body and removable seat-forming insert forming a passage for pressurized fluid flow and a solid clapper pivotally suspended from the insert, said clapper being movable by gravity to a closed position, in which it blocks the passage, and a fully open position in which the clapper is suspended by the pressurized fluid flow against the force of gravity and in which it contacts the body, the clapper having a planar upstream surface and convex semi-spherical downstream surface, the body forming a cavity having a concave semi-spherical surface having the same radius as the clapper, whereby it conforms with the clapper's convex surface and provides a stop surface, said clapper being positioned so that, on being raised into the fully open position, it seats in the cavity, contacts the stop surface and bears evenly across said surface.

* * * * *